Figure 1:
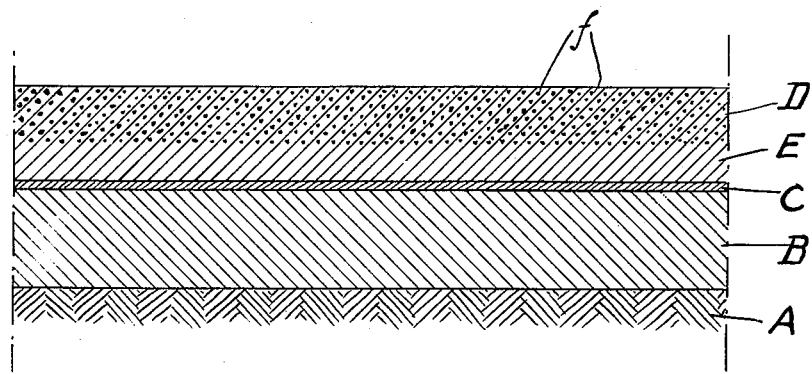

Aug. 29, 1939.   J. B. WARDEN   2,171,153
PAVEMENT
Filed Dec. 15, 1936

INVENTOR
John B. Warden
BY
ATTORNEYS.

Patented Aug. 29, 1939

2,171,153

UNITED STATES PATENT OFFICE 2,171,153

PAVEMENT

John B. Warden, Harrisburg, Pa., assignor to Barber Asphalt Corporation, Barber, N. J., a corporation of New Jersey Application December 15, 1936, Serial No. 115,898

19 Claims. (Cl. 94—25)

This invention relates to an improvement in pavement of the type formed with a stabilized mixture of earthy or mineral materials adaptable to roads, streets, footpaths, flying fields, playgrounds, and the like.

Pavements of the type to which this invention relates are constructed, as is well known, by compacting a wet, stabilized mixture of earthy or mineral material, formed by the admixture with material available at the site of the improvement of graded earthy or mineral materials selected and graded with respect to the character and grading of the available material so as to produce a mixture having a minimum of voids and free from an excess of clay, silt, or the like material on the one hand and of said, gravel, or the like material on the other hand.

Pavements so formed depend for their durability upon the presence of moisture and since even the most skillfully prepared mixtures as known heretofore will not normally maintain a proper balance of moisture to insure inherent stability, it has been customary to mingle with the mixture a deliquescent salt, such as sodium chloride, calcium cholride, or the like, and to sprinkle the surface of the pavement, from time to time, with such a salt, or a solution thereof, in order to supply moisture to the pavement from the atmosphere. Again, in order to maintain a proper balance of moisture on such pavement, it has been known to apply a water-impervious surface or carpeting of bituminous material over the surface of the pavement in order to retain original moisture therein.

The use of a deliquescent salt has not proved satisfactory in maintaining proper moisture balance, since the salt rapidly leaches away under rainfall and its effect is lost, with the result that the pavement rapidly becomes unstable due to loss of moisture and readily dusts and wears away under traffic. On the other hand, the provision of a bituminous surfacing or carpet has proved unsatisfactory, since it rapidly breaks down under traffic leaving the pavement unprotected and permitting it to become unstable through loss of moisture.

Now, it is the object of this invention to provide a pavement of the stabilized type which will retain the advantages of economy and simplicity in formation and repair possessed by such pavement heetofore and, at the same time, one which will inherently maintain proper moisture balance without attention and consequently will be highly resistant to dusting and wear under traffic.

The pavement in accordance with this invention comprises essentially a stabilized mixture of earthy or mineral material with which is admixed a bituminous composition in finely divided or pulverized form. The bituminous composition may be admixed with the stabilized mixture throughout the depth of the pavement or only adjacent to the surface of the pavement and, if desired, a deliquescent salt may be included in the mixture or may comprise a layer intermediate the depth of the pavement.

The bituminous composition may comprise any admixture of bitumen and a substance substantially insoluble in water and capable of extracting or taking up moisture, such, for example, as clay, or other similar earthy matter. The composition will necessarily be of a hardness such that it can be reduced to a fine state of subdivision or pulverized and the bitumen per se, which may be a native asphalt, a petroleum asphalt, a coal tar or wood tar pitch, or the like, will desirably be of a hardness such as to show a penetration of not more than 20 at 77° F. (A. S. T. M. standard method).

Preferably the bituminous composition will be an emulsion of the oil-in-water type, such as native Trinidad asphalt comprising about 39–56% hard bitumen, about 25–45% colloidal clay, other earthy matter, about 0.5% of water-soluble salts having deliquescent properties, such as sodium chloride, magnesium chloride and the like, and about 5–33% water, or a synthetic emulsion comprising bitumen, a water-soluble salt having deliquescent properties, such as sodium, magnesium chloride, or the like, water and clay, or the like.

The bituminous composition may be present in the stabilized mixture of earthy or mineral material in widely varying proportion; but preferably will be present in amount such that the amount of bitumen alone will be within about the range 3–10% by weight of the stabilized earthy or mineral matter.

In the formation of a pavement in accordance with this invention, the procedure will, generally speaking, be similar to that heretofore followed in the production of pavement with stabilized mixtures of earthy or mineral matter. Thus, the earthy or mineral matter at the site of the improvement will be tested and the requisite material of proper character and grading, as limestone, stone screenings, fine anthracite coal, slag, or the like, provided. The materials in proper proportion will then be mixed, together with a bituminous composition in pulverized form and, for example, comprising bitumen and clay, or an emulsion of Trinidad asphalt, in amount such as to provide about 3–10% of bitumen by weight of the stabilized earthy material. The mixing may be done at any remote point, but most conveniently will be done on the site of the improvement in accordance with well known practice.

The bituminous composition may be admixed and dispersed throughout the full depth of the pavement, or it may be admixed with the stabilized materials only throughout a surface layer. For completion of the pavement the mixture, including the bituminous composition, will be thoroughly wetted with water and finally compacted, for example, by rolling.

A pavement in accordance with this invention is more specifically illustrated in the accompanying drawing, in which the figures are cross-sectional views of pavements embodying the invention.

In the drawing Fig. 1, A indicates the foundation or subgrade upon which the pavement is constructed. B indicates a base layer, of a thickness of say three inches, of a compacted, moist, stabilized mixture of earthy or mineral material. C indicates a relatively thin layer of a deliquescent salt, as calcium chloride, sodium chloride, or the like, which may or may not be included as desired. E indicates a surface layer, of a thickness of say two inches, of a compacted, moist, stabilized mixture of earthy or mineral material, with which is admixed and throughout which is dispersed particles $f$ of a bituminous composition comprising, for example, pulverized Trinidad asphalt, in amount of about 20% by weight of the stabilized earthy material present in the surface layer D. Desirably about, for example, 0.25–2% of soluble salts such as calcium, magnesium or sodium chloride will have been added to the Trinidad asphalt when it is pulverized.

By way of example, the stabilized mixture of earthy or mineral material included in the layers B, E and D may comprise a fifty-fifty mixture of average earth and limestone screenings grading, from example, from ¼" to dust.

Figure 2:
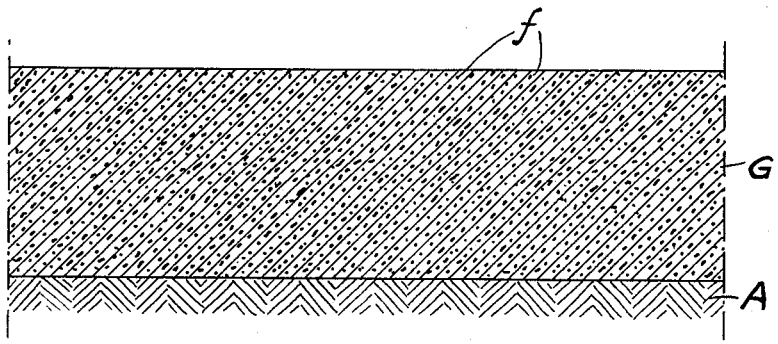

As will be appreciated, the layers B, E and D may be of widely varying thickness, the particles $f$ of bituminous composition may be dispersed throughout the layers B and E as well as throughout the surface layer D and, if desired, the layer of salt C may be omitted and, as shown by Figure 2, the pavement composed of a single layer G with the particles $f$ of bituminous composition dispersed throughout or merely adjacent to the surface.

In general, the pavement in accordance with this invention will retain unaided a proper moisture balance due to the presence of the bituminous composition, which will act to attract moisture to itself, due to the presence of clay, or the like, and the deliquescent salt, if included, by virtue of which it will swell and close the voids in the stabilized mixture, and, at the same time, whether it be dispersed throughout the pavement or merely adjacent the surface, will act to waterproof the surface by shedding excess rain water and assist in dry seasons in preventing evaporation.

As will be appreciated, the particles of the bituminous composition will not coalesce, but will remain in a dispersed state in the mix. As a consequence, while the bituminous composition will promote a degree of bonding of the particles of the earthy or mineral matter by virtue of its bitumen content as well as by its maintenance of the proper moisture content or balance for a water bond, it will not effect formation of a bituminous surfacing or carpeting and will not in the slightest interfere with repair or reconditioning of the surface, as by dragging or by scarifying, redistribution and recompacting.

With reference to the pavement illustrated in the drawing, the particles $f$ of bituminous composition, dispersed throughout the surface layer D will act to bond, to a degree, and to maintain the proper moisture balance in the surface layer so that the stability of the surface and consequent resistance to dusting and wear under traffic will be maintained. Further, the particles $f$ of bituminous composition will waterproof the surface layer D and prevent, to a large degree, the passage of water from the surface of the pavement into the body thereof and consequently will largely prevent or delay leaching out of the salt forming the layer C. At the same time the particles $f$ will prevent loss of saline solution by capillary action through the surface layer and will hence restrict the field of dissolved salt to the base layer B and the layer E.

It will be understood that the pavement according to this invention may be surfaced over, if desired, and may form a base or foundation for any desired form of wear surface.

It will be understood that various modification in detail from that involved in the above description may be made without departing from the scope of this invention, which is contemplated as embracing within its scope not only pavements having the novel composition described, but also mixtures adapted for the formation of such pavement.

What I claim and desire to protect by Letters Patent is:

1. A pavement comprising a cold compacted stabilized mixture of earthy materials having dispersed therein without substantial coalescence a solid bituminous composition in finely divided form the solid bituminous composition including a water-insoluble substance capable of taking up moisture.

2. A pavement comprising a cold compacted stabilized mixture of earthy materials having dispersed therein without substantial coalescence a solid bituminous composition including a water-soluble salt having deliquescent properties, a water-insoluble earthy material capable of taking up moisture and a bitumen in finely divided form.

3. A pavement comprising a cold compacted stabilized mixture of earthy materials having dispersed therein without substantial coalescence a solid bituminous clay emulsion of the oil-in-water type in finely divided form and capable of attracting moisture.

4. A pavement comprising a cold compacted stabilized mixture of earthy materials having dispersed therein without substantial coalescence a solid bituminous composition in finely divided form, said bituminous composition comprising a mixture of bitumen and clay.

5. A pavement comprising a cold compacted stabilized mixture of earthy materials having dispersed therein without substantial coalescence a solid bituminous composition in finely divided form, said bituminous composition comprising a mixture of bitumen, a water-soluble salt having deliquescent properties and clay.

6. A pavement comprising a cold compacted stabilized mixture of earthy materials, having dispersed therein without substantial coalescence native Trinidad asphalt in finely divided form.

7. A pavement comprising a cold compacted stabilized mixture of earthy materials, having dispersed therein without substantial coalescence a solid bituminous clay composition in finely divided form and capable of attracting water, in amount equivalent to about 3-10% of bitumen by weight of the stabilized mixture of earthy material.

8. A pavement comprising a compacted base layer of a stabilized mixture of earthy materials and a cold compacted surface layer of stabilized earthy materials having dispersed therein without substantial coalescence a bituminous clay composition in finely divided form.

9. A pavement comprising a compacted base layer of a stabilized mixture of earthy materials, a cold compacted surface layer of stabilized earthy materials having dispersed therein without substantial coalescense a bituminous clay composition in finely divided form and an intermediate layer of deliquescent salt.

10. A mixture adapted for the formation of a pavement by compacting in the cold, comprising a stabilized mixture of earthy materials having dispersed therein without substantial coalescence a solid bituminous composition in finely divided form, the solid bituminous composition including a substance which is insoluble in water and capable of taking up moisture.

11. A mixture adapted for the formation of a pavement by compacting in the cold, comprising a stabilized mixture of earthy materials having dispersed therein without substantial coalescence a solid bituminous-clay composition including a water-soluble salt having deliquescent properties in finely divided form.

12. A mixture adapted for the formation of a pavement by compacting in the cold, comprising a stabilized mixture of earthy materials having dispersed therein without substantial coalescence a solid bituminous composition in finely divided form and comprising a bituminous-clay emulsion of the oil-in-water type and capable of attracting moisture.

13. A mixture adapted for the formation of a pavement by compacting in the cold, comprising a stabilized mixture of earthy materials having dispersed therein without substantial coalescence a solid bituminous composition in finely divided form and comprising bitumen and clay.

14. A mixture adapted for the formation of a pavement by compacting, comprising a stabilized mixture of earthy materials having dispersed therein without substantial coalescence a solid bituminous composition in finely divided form and comprising bitumen, a water-soluble salt having deliquescent properties and clay.

15. A mixture adapted for the formation of a pavement by compacting, comprising a stabilized mixture of earthy materials having dispersed therein without substantial coalescence a solid bituminous composition in finely divided form and comprising Trinidad asphalt.

16. A pavement comprising a base and superimposed thereon a cold compacted surface layer comprising a stabilized mixture of earthy materials having dispersed therein without substantial coalescence a solid bituminous composition in finely divided form, the solid bituminous composition including a water-insoluble earthy material capable of taking up moisture.

17. A mixture adapted for the formation of a pavement by compacting in the cold comprising a stabilized mixture of earthy materials having dispersed therein without substantial coalescence a solid bituminous-clay composition in finely divided form in amount equivalent to about 3-10% of bitumen by weight of the stabilized mixture of earthy materials.

18. A pavement comprising a cold compacted stabilized mixture of earthy materials having dispersed therein without substantial coalescence a solid bituminous composition in finely divided form, the solid bituminous composition including a water-insoluble earthy material capable of taking up moisture.

19. A mixture adapted for the formation of a pavement by compacting in the cold comprising a stabilized mixture of earthy materials having dispersed therein without substantial coalescence a solid bituminous composition in finely divided form, the solid bituminous composition including a water-insoluble earthy material capable of taking up moisture.

JOHN B. WARDEN.